(12) United States Patent
Thompson et al.

(10) Patent No.: US 7,596,500 B1
(45) Date of Patent: Sep. 29, 2009

(54) SYSTEM AND METHOD FOR PROCESSING IMPORT/EXPORT TRANSACTIONS

(75) Inventors: Cliff Burke Thompson, Pflugerville, TX (US); David Kirby, Austin, TX (US)

(73) Assignee: CustomsPoint Inc., Austin, TX (US)

( * ) Notice: Subject to any disclaimer, the term of this patent is extended or adjusted under 35 U.S.C. 154(b) by 1091 days.

(21) Appl. No.: 09/576,462

(22) Filed: May 23, 2000

(51) Int. Cl.
G06F 21/00 (2006.01)
(52) U.S. Cl. .............................. 705/1; 705/50; 705/14; 705/417; 705/26; 705/27
(58) Field of Classification Search .................. 705/26, 705/27, 417, 14, 1
See application file for complete search history.

(56) References Cited

U.S. PATENT DOCUMENTS

| | | | |
|---|---|---|---|
| 5,710,887 A * | 1/1998 | Chelliah et al. ............... | 705/26 |
| 5,940,807 A | 8/1999 | Purcell ......................... | 705/26 |
| 5,974,418 A * | 10/1999 | Blinn et al. ................... | 707/100 |
| 6,101,485 A * | 8/2000 | Fortenberry et al. .......... | 705/27 |
| 6,141,666 A * | 10/2000 | Tobin .......................... | 715/207 |
| 6,263,317 B1 * | 7/2001 | Sharp et al. ................... | 705/26 |
| 6,460,020 B1 * | 10/2002 | Pool et al. .................... | 705/26 |

FOREIGN PATENT DOCUMENTS

| | | | |
|---|---|---|---|
| WO | WO 00/70519 | * 11/2000 | |
| WO | WO-01/24096 A1 * | 4/2001 | ................... 705/26 |

OTHER PUBLICATIONS

Alexis Muellner, "Software firm taking aim at FedEx, DHL and UPS", Jul 30, 1999, South Florida Business Journal (Miami, Fl, US), V19, N50, p. A6.*
Joseph Bonney, Electronic Customs tariffs, rules. (TradeRef tariff and trade information software), Jan. 1995, American Shipper, v37, n1, p. 44(2).*
"Customs and Trade Automated Interface Requirements", Appendix G, Jan. 2000, G-10.*
Kroenke, David M. Database Processing: Fundementals, Design, and Implementation. © 2000 Prentice-Hall, Inc. New Jersey. 7$^{th}$ ed. pp. 3-22, 25-45.*
I Kroenke, David M. Database Processing: Fundementals, Design, and Implementation. © 2000 Prentice-Hall, Inc. New Jersey. 7th ed. pp. 3-22, 25-45.*

* cited by examiner

*Primary Examiner*—Calvin Loyd Hewitt, II
*Assistant Examiner*—Cristina Owen Sherr
(74) *Attorney, Agent, or Firm*—Fish & Richardson P.C.; Kelly Kordzik

(57) ABSTRACT

Import/export transactions whereby an item is to be transported from one country to another are automated. An invoice containing a list of one or more part numbers is entered in at a web site and loaded to a server containing a database. A database is of part numbers and their corresponding tariff classification numbers. The uploaded invoice will be compared to the database to output a data record whereby the one or more part numbers uploaded in the invoice now have tariff classification numbers and daily calculation associated therewith. This data record can then be accessed over the Internet at another web site by a customs broker for use in transmitting a report to a customs entity.

28 Claims, 4 Drawing Sheets

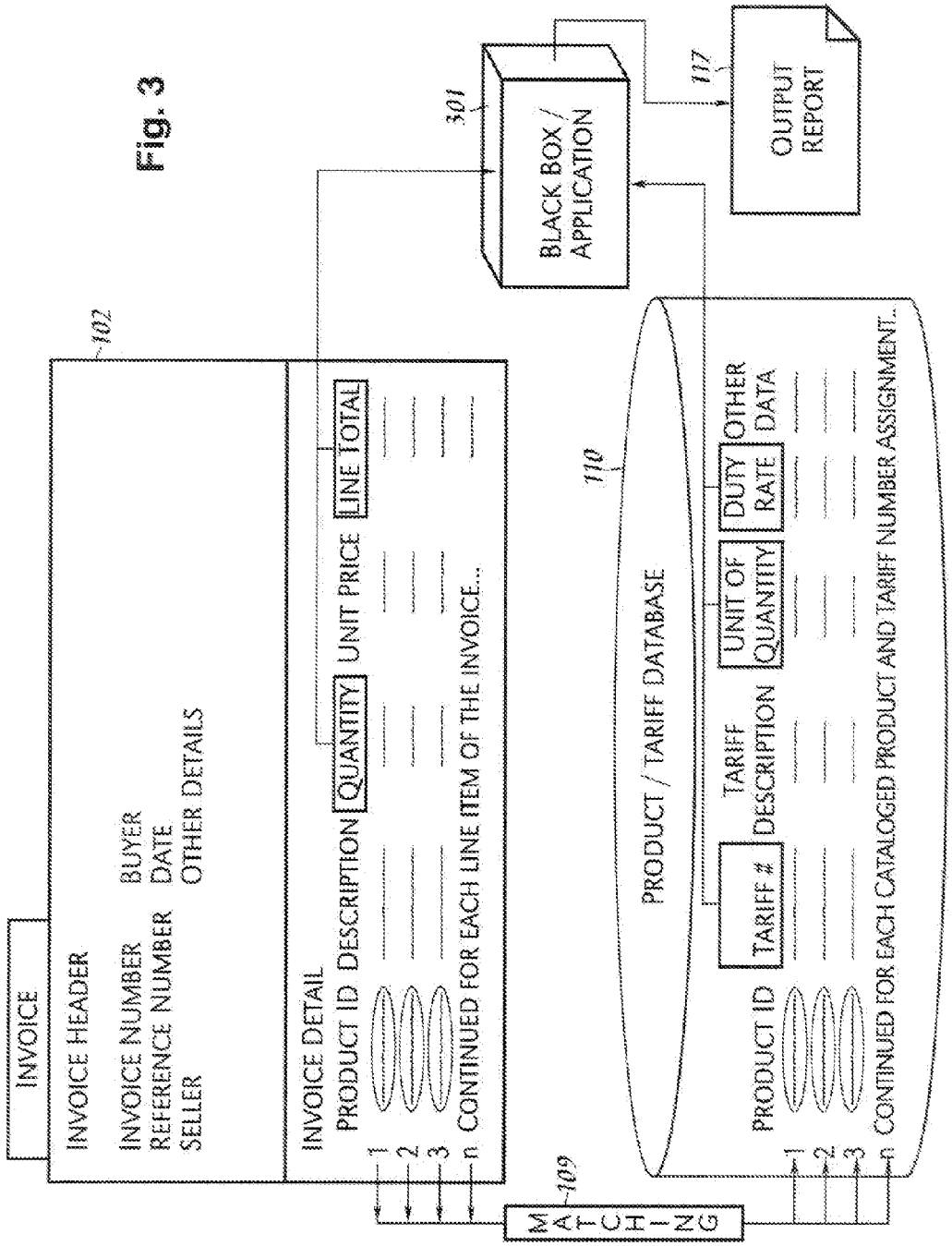

SYSTEM AND METHOD FOR PROCESSING IMPORT/EXPORT TRANSACTIONS

TECHNICAL FIELD

The present invention relates in general to processing customs transactions, and in particular, to the automation of the processing and storage of parts and tariff number assignments with summarization for customs reporting purposes utilizing the Internet.

BACKGROUND INFORMATION

For thousands of years people of the world have engaged in trade. Trade fuels economies, creates jobs, increases the selection of goods available to consumers, and promotes the diffusion of cultures. In many countries, including the United States ("U.S."), one of the earliest sources of revenue to the government was the assessment of duties against imported goods. Until recently, each country tended to use their own singular system for categorizing imported goods. Since 1988, many countries of the world have begun using a harmonized system of tariff classification that was adopted at the International Convention on the Harmonized Commodity Description and Coding System. As a result, the tariff number headings and sub-headings are now the same in any country that is a signatory to the Harmonized System Convention. The tariff numbers and commodity descriptions are published by each country and mandated to be used for almost every imported item. The tariff numbers provide governments a systematic way to categorize all imported goods, to make duty assessments, to gather trade statistics, to share trade data with other countries, and for other purposes. In most countries, the tariff number must be determined and reported at the time of export and then at the time of importation into the destination country. For shipments between countries that have adopted the Harmonized System Convention, the assigned tariff numbers have validity in both countries.

U.S. importers are required by law to take responsibility for providing to U.S. Customs the correct tariff classification for each imported item and to pay the correct duty on the goods imported. In common U.S. business practice the importer employs the services of a custom house broker to handle most aspects of their import customs clearances. However, with passage of the Customs Modernization Act in 1993 the importer became fully liable for the accuracy of information presented—regardless of who does the customs compliance work.

The process of identifying and assigning tariff numbers to commodities is often inexact, tedious, and manually performed. Much of the information and resources necessary for accurate tariff processing may not be available to the customs broker. Importers and customs brokers spend a large amount of time assigning tariff numbers to imported goods. And, it is not uncommon for this process to be performed repeatedly for the exact same commodity due to the inability to access the information that may have already been determined during a previous importation. Working against the legal requirement for accurate tariff number identification is the time pressure to obtain release of the goods quickly. The later objective often compromises the integrity of accurate tariff assignment.

Additionally, the tariff processing is often performed by individuals who are poorly trained and who are burdened with many other imports to simultaneously process. Complex tariff number assignments and high item count imports require an especially large amount of time to process. This time is often not available to the average customs broker. Nevertheless, the importer may still be subject to severe fines, penalties, and sanctions should their customs information be found to be inaccurate.

To further elucidate the process and its greater context, consider a typical air freight import transaction. When the goods are ready to be exported from the foreign country, the shipper will prepare a commercial invoice. The invoice accompanies the goods as they are transported to the departure airport. In most countries (and depending upon terms of shipment) the exporter will contact a freight forwarder who will coordinate transportation of the goods, prepare and submit export clearance documents (containing HTS numbers), and will book the cargo with an airline. The freight forwarder also prepares bills of lading as a contract of carriage for the goods. Both the invoice and the bill of lading as a contract of carriage for the goods. Both the invoice and the bill of lading are distributed to the import clearance agent in the U.S. Upon importation, the importers designated Customhouse broker prepares and submits Customs entry paperwork (containing HTS numbers) to U.S. Customs in order to obtain release of the goods.

During the preparation of the Customs entry paperwork, a Harmonized Tariff Number must be assigned to each item listed on the import invoice(s). In common practice, the Customs broker uses inefficient and imprecise manual methods to determine and assign the HTS numbers. The extensive contents of the Harmonized Tariff Schedule are perused (containing over 8000 HTS numbers), handwritten notes are consulted, files of previous importations are pulled, and/or printed lists may be consulted. The accuracy of this process can also be impaired by the common usage of Customs brokerage agents who are inadequately trained and who are burdened with many other imports to simultaneously process. In conjunction with the HTS assignment process, the Customs broker extracts additional information from the invoice, the bill of lading(s), and other supporting documents. The information is then submitted t U.S. Customs electronically or on paper using forms, protocols, and formats proscribed by Customs. Complex tariff number assignments and high item count importations require an especially large amount of time to process. This time is often not available to a Customs broker. Nevertheless, the importer may still be subject to severe fines, penalties, and sanctions should their Customs information be found to be inaccurate.

An exportation from the U.S. is performed in a manner similar to the process just described for importation. In particular, the process of assigning HTS numbers for export purposes is still usually performed using inefficient and inaccurate manual methods.

The problem with the foregoing process is that the tariff classification has to be performed manually by a customs broker having to identify the goods, and then manually compare that identification in a tariff classification book, and then manually entered into proprietary systems to calculate any duties owed to the government customs office. Such a manual process is tedious, expensive, time consuming and prone to errors. Therefore, what is needed is a system whereby the importer can take an active role in managing their commodity/tariff number assignments prior to importation; when most tariff decisions have already been made prior to an importation; and when the predetermined tariff numbers can be quickly and efficiently assigned to each associated imported item. For review and use by parties to the import or export transaction.

SUMMARY OF THE INVENTION

The present invention addresses the above needs by implementing a Product Classification Database (PCD), which consists of a database and interface that utilizes Internet standards and protocols to enable users to input and retrieve commodity information and the associated tariff information through an Internet site. In addition, the database will be written so as to match most standards accepted today by companies utilizing supply chain management software systems.

The PCD is designed to meet the needs of importers, customs brokers, and freight forwarders handling the importation/exportation of products with multiple tariff classifications per importation/exportation. Because the PCD is Internet based, authorized users will be able to access the database from any PC with Internet access and will be able to create product databases, update/add/delete items from existing databases, and perform various reporting and archiving functions. Authorized users will be able to upload invoice information either electronically or manually. The application will support the electronic upload of data stored in certain commonly recognized formats such as Microsoft Excel® spreadsheets, Word and ASCII. Once the invoice data is uploaded, the application will automatically assign tariff numbers to all the recognized invoice items and will generate a summary report in a form appropriate for incorporation into a customs entry.

The PCD can be hosted on a proprietary website.

More specifically, a customer will utilize the Internet website to create databases that provide for the storage and retrieval of product and tariff classification data—product ID number, product description, tariff number, units of measure, etc. This information is in turn used to process import invoices and summarize information necessary for the creation of a customs entry. The database can be managed by an importer, exporter, or their assigned and authorized agents.

The database can then be utilized by sending invoice information into the website using electronic or manually entered data. The invoice information will be matched against the online database, the associated tariff numbers assigned, and then a summarized report is output for use in preparing a customs entry or export declaration.

After the invoice and database information have been processed and the appropriate tariff numbers assigned, an invoice record is created. This record can be downloaded to any entity that has authorization to access this account on the Internet site. This invoice record set can be utilized by the importer or that assignee to facilitate import or export declarations.

The invoice information is retained at the website and is available to any authorized party with access to this account or the Internet. The historical invoice data is also available for analysis using tools provided at the website.

One advantage of the present invention is that it provides the importer or exporter with the means to actively manage import or export data (particularly tariff classifications)—from anywhere in the world with Internet access, collaboratively, and in real time.

An other advantage of the present invention is that it enhances compliance with applicable import/export regulations by providing a systematic, easily accessible, and user friendly means for managing tariff classification data. Improvements in compliance reduce the importer's risk of incurring fines, penalties, and other sanctions.

In addition, another advantage is that the classified invoice is also stored for access by authorized parties for summary information required by the business utilizing the website application tool.

A further advantage of the present invention is that it provides up-to-date vital information regarding the import/export transaction.

Yet still another advantage of the present invention is that it will serve as are source for tariff classification assistance that will improve accuracy and efficiency.

Yet another advantage of the present invention is that it serves to enhance customs broker/freight forwarder capabilities by allowing them to process more entries per worker more efficiently. Yet another advantage is it serves to reduce the number of errors associated with the classification process.

The foregoing has outlined rather broadly the features and technical advantages of the present invention in order that the detailed description of the invention that follows may be better understood. Additional features and advantages of the invention will be described herein after which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates further detail of the import/export system and method of the present inventions.

DETAILED DESCRIPTION

Figure 1A:
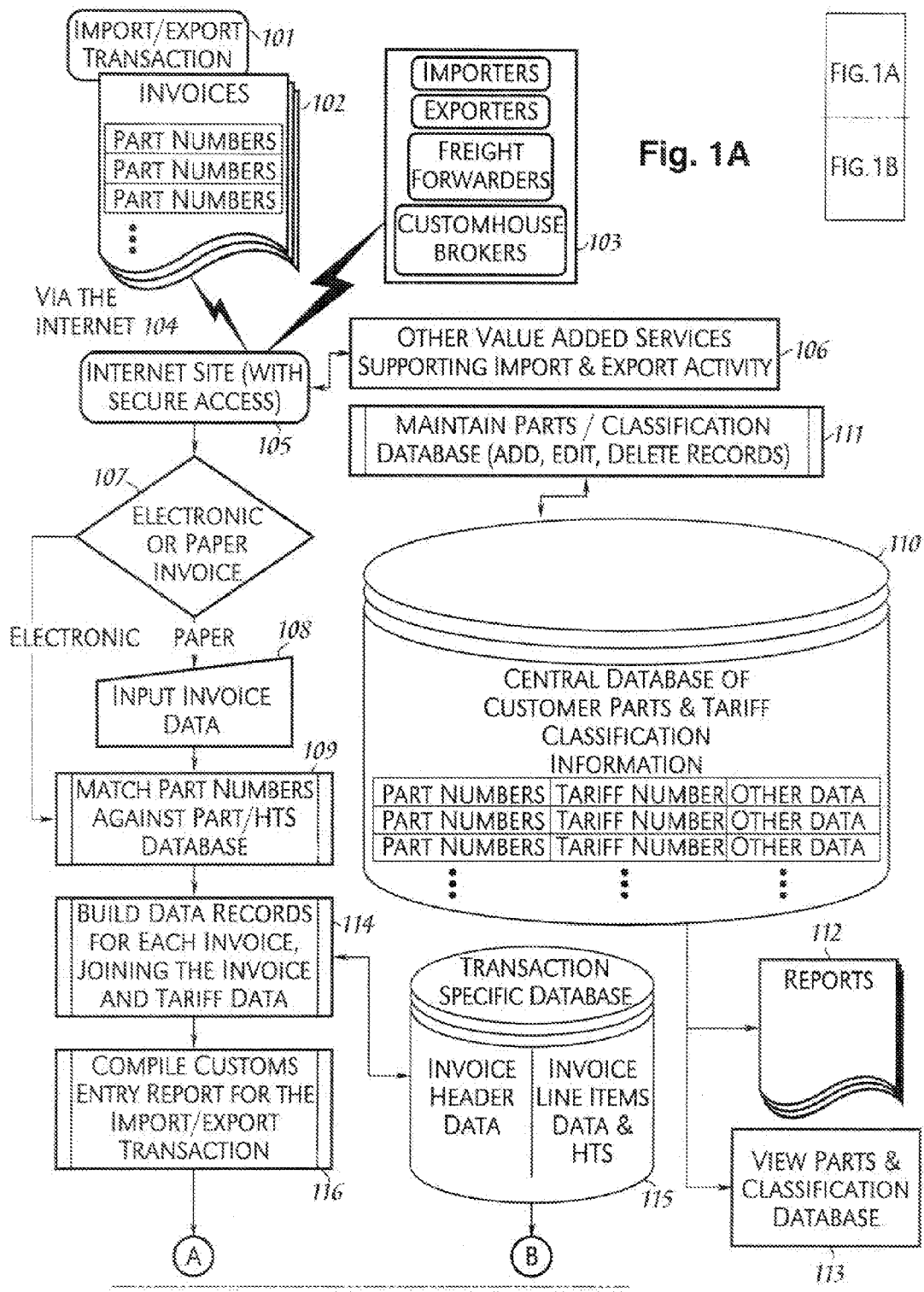
FIG. 1 illustrates the import/export system and method of the present invention.

In the following description, numerous specific details are set forth such as specific hardware configurations to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The present invention implements an Internet application that will enable importers and customs brokers to create and access an online database of parts and tariff information that will facilitate tariff classification compliance, reduce the time needed for tariff number assignment, and enhance a company's tariff maintenance and reporting capabilities.

The present invention automates the process of tariff number assignment for import and export transactions. Generally, all countries require some sort of statistical reporting that involves a tariff or classification number for a particular item or commodity being bought and sold with respect to an import or export transaction, along with an accompanying description. Further, with such an import or export transaction, there is usually some sort of duty or tariff rate associated with the particular item when it either leaves or enters a particular country. Hereinafter, the present invention will be described with respect to an import transaction 101, but is also applicable in the same manner with respect to an export transaction. Associated with an import transaction 101, an invoice or invoices 102 will be generated in accordance with the purchase agreement for the imported goods, whereby the invoice 102 will include a list of the items to be bought and imported. The invoice 102 will have a list of the part numbers or commodities involved in that transaction as being exported or imported.

FIG. 3 illustrates further detail of a sample invoice 102 where the invoice header includes the invoice number, reference numbers, the identification of the seller, the identification of the buyer, the date and any other details. The invoice detail includes the product identification, a possible description for each of the products, the quantity shipped, unit price, and line total.

Returning to FIG. 1, box 103 represents, that in addition to customs house brokers, an importer or exporter usually contracts for the services of freight forwarders and/or international integrators or consolidators. Their job is to plan, implement, and coordinate the logistics of moving the goods. They are responsible for ensuring the products are picked up at origin, the proper documents (i.e., bills of lading, export documents, import documents and declarations) are generated, and the movement of freight to its destination is completed. Hereinafter, "imports" will refer to all entities instigating an import or export process, including those in box 103. In accordance with an embodiment of the present invention, the importer can then send the invoice in an electronic format via the Internet 104 to an Internet website 105 (with secure access if needed). If the importer does not have an ability to send an electronic version of the invoice 102 to the website 105 (the invoice remains as a paper invoice (step 107)), then the importer can in step 108 manually input the invoice data at the website 105. For example, website 105 can implement data entry fields for permitting the importer to enter part numbers, descriptions and quantities.

Nevertheless, the part numbers entered into the website 105 are matched in step 109 to a central database of customer parts and tariff classification information 110. FIG. 3 illustrates how the product/database 110 includes product ID's corresponding tariff numbers, corresponding tariff descriptions, duty rates, etc. The product ID's within the invoice 102 and the database 110 are matched in step 109.

Furthermore, step 111 shows that a customer or website administrator can update and maintain the part/classification database 110 by adding, editing, or deleting records.

The comparison process in step 109 can be implemented through a process whereby each of the part numbers (or other product identifier (ID)) from the invoice 102 are compared to part numbers within the database 110, which will then output a corresponding tariff classification for each part number.

Database 110 can be viewed in step 113 by an administrator, and reports 112 can be generated so that the system administrator or customer can track such statistics as how many times a particular customer accesses the database 110.

In step 114, not only is each part number in the invoice associated with a tariff classification or number, but the process can also produce an automatic estimation of any duties owed.

Database 115 keeps a record of every transaction, which can be used for future reference.

In step 116, a customs entry report is compiled for the import transaction, and then a master report is created to facilitate the preparation of the customs entry. The customs entry report is sorted by tariff numbers and a value is summed for each of the tariff numbers. The master report created in 117 is essentially a summarized invoice. Thereafter, the invoice can be downloaded a customs broker's system 118 for subsequent automatic transmission to the appropriate customs entity. As a result, a custom house broker 118 can access the master report from the Internet site 105 for a print out, download the file, or the file can be sent through a direct interface with the Automated Broker Interface software or similar system. The custom house broker 118 can then utilize this master report within their own automated systems to transmit to the appropriate customs authority.

FIG. 3 illustrates how the black box/application 301, which comprises one or more of the steps 114 and 116 utilize the quantity and line total information from the invoice 102 and the tariff classification, unit of quantity, and duty rate information from the database 110 to build a data record for each invoice and to compile a customs entry report, which is eventually translated into an outputted master report 117

The present invention can also implement other value-added functions, such as providing other services that might support an import activity 106, link up a harmonized tariff schedule 119 in a split screen, or any other reference databases 120, such as links to the Food and Drug Administration, or to other legal reporting agencies. Further, copies of the master reports can also be maintained as customer-based information 121 for each of the customer's transactions through this system, which will enable periodic reports to be created, etc.

Figure 1B:
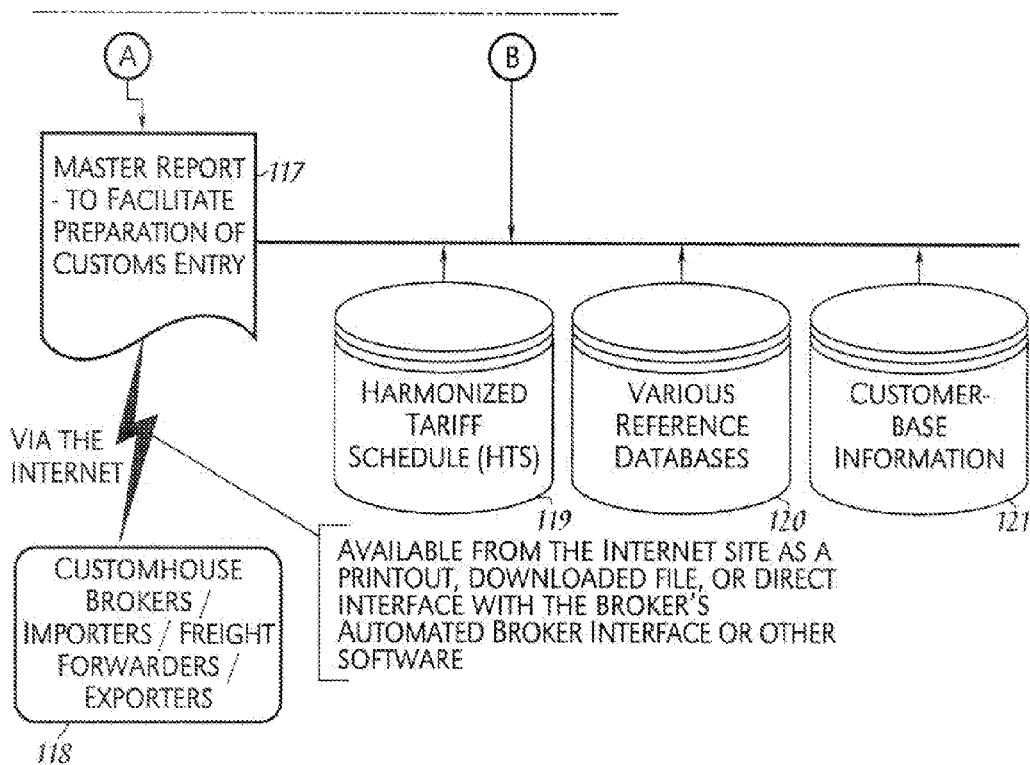

As can be seen by FIG. 1, the present invention can be implemented over a network, such as the Internet, using computers, routers, servers, etc. Each of these components comprises a data processing system in a manner as illustrated in FIG. 2.

Figure 2:
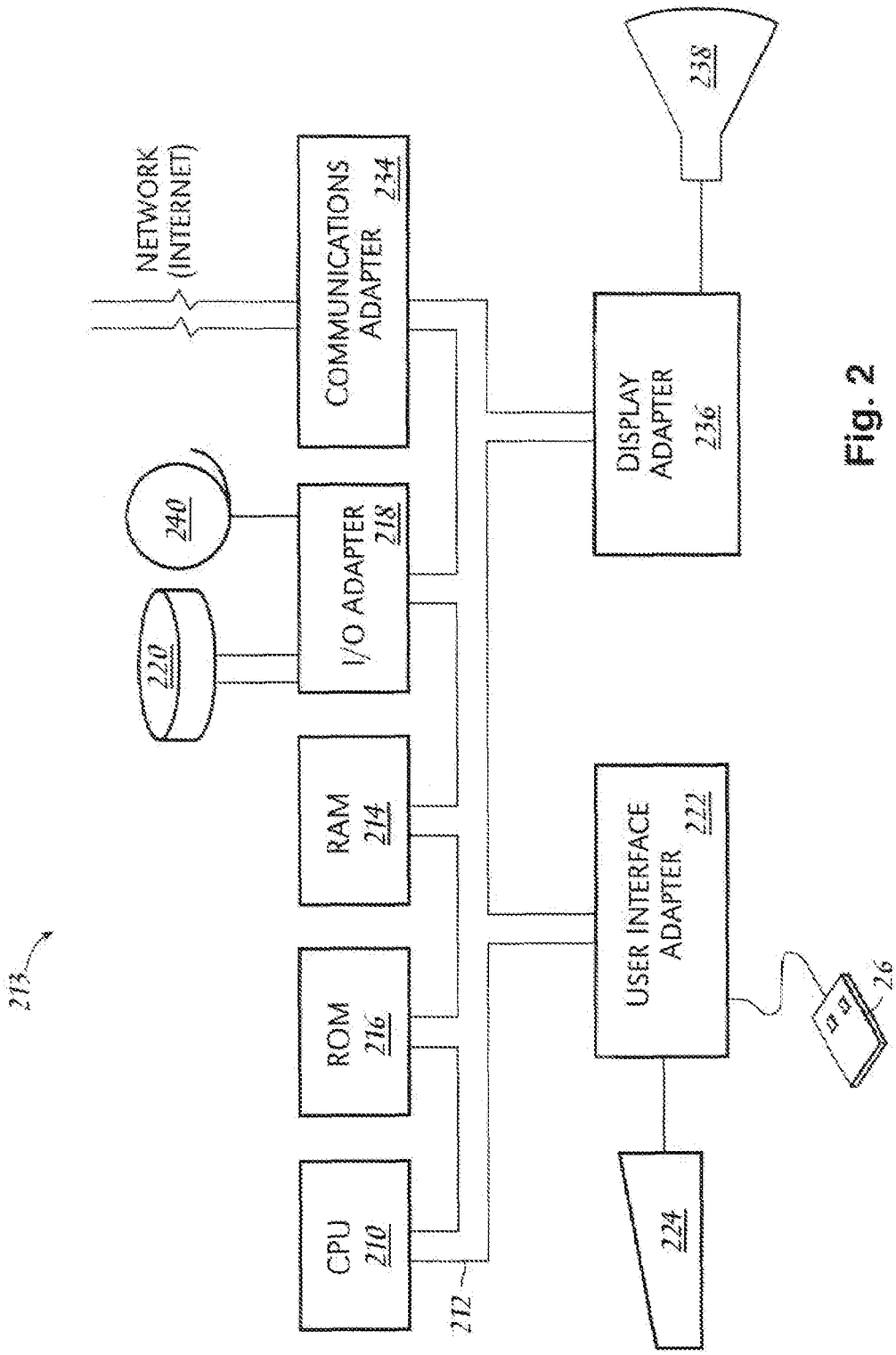
FIG. 2 illustrates a data processing system configurable in accordance with the present invention.

Referring to FIG. 2, an example is shown of a data processing system 213 which may be used for components of the invention. The system has a central processing unit (CPU) 210, which is coupled to various other components by system bus 212. Read only memory ("ROM") 216 is coupled to the system bus 212 and includes a basic input/output system ("BIOS") that controls certain basic functions of the data processing system 213. Random access memory ("RAM") 214, I/O adapter 218, and communications adapter 234 are also coupled to the system bus 212. I/O adapter 218 may be a small computer system interface ("SCSI") adapter that communicates with a disk storage device 220 and tape drive 240. Communications adapter 234 interconnects bus 212 with an outside network enabling the data processing system to communicate with other such systems. Input/Output devices are also connected to system bus 212 via user interface adapter 222 and display adapter 236. Keyboard 224 and mouse 226 are interconnected to bus 212 via user interface adapter 222. Display monitor 238 is connected to system bus 212 by display adapter 236. In this manner, a user is capable of inputting to the system throughout the keyboard 224 or mouse 226 and receiving output from the system via display 238.

Preferred implementations of the invention include implementations as computer systems programmed to execute the method or methods described herein, and as a computer program product. According to the computer system implementation, sets of instructions for executing the method or methods are resident in the random access memory 214 of one or more computer systems configured generally as described above. Until required by the computer system, the set of instructions may be stored as a computer program product in another computer memory, for example, in disk drive 220 (which may include are movable memory such as an optical disk or floppy disk for eventual use in the disk drive 220). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Although the present invention and its advantages have been described in detail, it should be understood that various changes, substitutions and alterations can be made hereinwithout departing from the spirit and scope of the invention.

What is claimed is:

1. A method for processing an import/export transaction over a computer network using a server comprising a tariff assignment application and a product database comprising:
    receiving, by the server, product information from a first terminal and storing the product information in the product database wherein the product information comprises product IDs, tariff classification, and duty rate information corresponding to each product ID;
    receiving, by the server, an invoice from a second terminal wherein the invoice comprises an invoice detail section that includes: a product ID corresponding to a product, and a unit of quantity of the product;
    matching, by the server, the product ID from the invoice detail section with a product ID from the product database and identifying a corresponding tariff classification from the matched product ID;
    generating, by the tariff assignment application, an import/export declaration report using the tariff classification, unit of quantity, and duty rate information from the matched product ID, and a master report using the generated import/export declaration report; and
    transmitting the invoice and the master report from the server to a customs broker/freight forwarder computer.

2. The method as recited in claim 1, wherein the transmitting of the invoice and master report includes e-mailing the master report to a third terminal coupled to the computer network.

3. The method as recited in claim 1, wherein the transmitting of the invoice and master report includes downloading the master report to a third terminal coupled to the computer network.

4. The method as recited in claim 3, wherein the master report is downloaded in response to access of the master report by a third terminal using a web browser.

5. The method as recited in claim 1, wherein the transmitting of the invoice and master report includes printing the master report.

6. The method as recited in claim 1, wherein the invoice is inputted into a web site associated with the server.

7. The method as recited in claim 1, further comprising updating the product database from a third terminal coupled to the computer network.

8. The method as recited in claim 1, further comprising recording results of the matching of the product ID from the invoice detail section with the product ID from the product database into a transaction database hosted by the server.

9. The method as recited in claim 1, wherein the product ID is unique to a particular company.

10. The method as recited in claim 9, wherein the import/export transaction is associated with the particular company.

11. The method as recited in claim 1 further comprising:
    modifying the product database to update the product IDs and/or tariff classification particular to each of the product IDs to ensure an accuracy of associations between the product IDs and corresponding tariff classifications.

12. The method as recited in claim 1, wherein the invoice lists products to be imported/exported, and each product is identified with a product ID.

13. The method as recited in claim 1, wherein the tariff classification is a harmonized tariff number for a particular country.

14. The method as recited in claim 1, wherein the product database is customized on a per customer basis to ensure that the matching of the product IDs with the tariff classifications is in compliance with local customs regulations.

15. A system for processing an import/export transaction over a computer network using a server comprising a tariff assignment application and a product database comprising:
    a processor; and
    a memory coupled to the processor storing computer readable instructions when executed cause the processor to perform the steps of:
    receiving product information from a first terminal and storing the product information in the product database wherein the product information comprises product IDs, tariff classification, and duty rate information corresponding to each product ID;
    receiving an invoice from a second terminal wherein the invoice comprises at least one invoice detail section that includes: a product ID corresponding to a product, and a unit of quantity of the product;
    matching the product ID from the invoice detail section with a product ID from the product database and identifying a corresponding tariff classification from the matched product ID;
    generating an import/export declaration report using the tariff classification, unit of quantity, and duty rate information from the matched product ID, and a master report using the generated import/export declaration report; and
    transmitting the invoice and the master report from the server to a customs broker/freight forwarder computer.

16. The system as recited in claim 15, wherein the transmitting step includes e-mailing the master report to a third terminal coupled to the computer network.

17. The system as recited in claim 15, wherein the transmitting step includes downloading the master report to a third terminal coupled to the computer network.

18. The system as recited in claim 17, wherein the master report is downloaded in response to access of the master report by a third terminal using a web browser.

19. The system as recited in claim 15, wherein the transmitting step includes printing the master report.

20. The system as recited in claim 15, wherein the invoice is inputted into a web site associated with the server.

21. The system as recited in claim 15, further comprising computer readable instructions when executed cause the processor to perform the step of updating the product database from a third terminal coupled to the computer network.

22. The system as recited in claim 15, further comprising computer readable instructions when executed cause the processor to perform the step of recording results of the matching of the product ID from the invoice detail section with the product ID from the product database into a transaction database hosted by the server.

23. The system as recited in claim 15, wherein the product ID is unique to a particular company.

24. The system as recited in claim 23, wherein the import/export transaction is associated with the particular company.

25. The system as recited in claim 15 further comprising computer readable instructions when executed cause the processor to perform the step of modifying the product database to update the product IDs and/or tariff classification particular to each of the product IDs to ensure an accuracy of associations between the product IDs and corresponding tariff classifications.

26. The method as recited in claim 15, wherein the invoice lists products to be imported/exported, and each product is identified with a product ID.

27. The system as recited in claim 15, wherein the tariff classification is a harmonized tariff number for a particular country.

28. The system as recited in claim 15, wherein the product database is customized on a per customer basis to ensure that the matching of the product IDs with the tariff classifications is in compliance with local customs regulations.

* * * * *